Jan. 8, 1929.  1,698,584
C. FELL
PIPE SKELP
Filed April 21, 1926
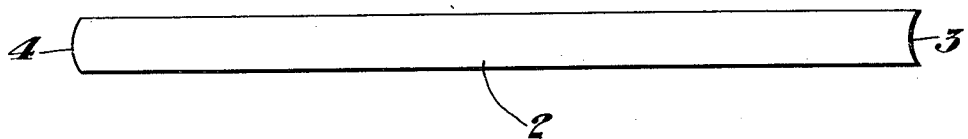
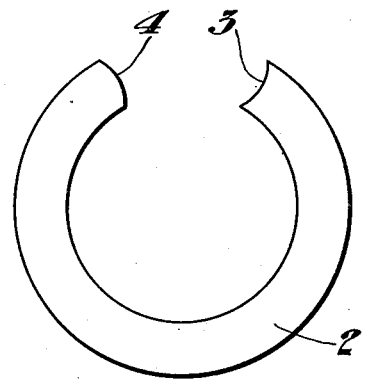
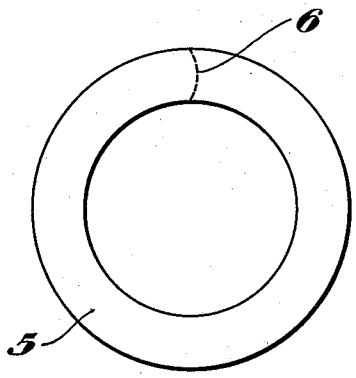
Witnesses:
Edwin Trueb
Inventor:
CHARLES FELL,
by: D. Anthony Usina
his Attorney.

Patented Jan. 8, 1929.

1,698,584

UNITED STATES PATENT OFFICE.

CHARLES FELL, OF ELYRIA, OHIO, ASSIGNOR TO NATIONAL TUBE COMPANY, A CORPORATION OF NEW JERSEY.

PIPE SKELP.

Application filed April 21, 1926. Serial No. 103,516.

This invention relates to pipe skelp and more particularly to butt-weld pipe skelp, and has for one of its objects the provision of skelp having novel welding edges which will provide a greater welding area.

Another object is to provide a pipe skelp having novel welding edges which may be made more uniform than the form of edges heretofore employed.

A further object is to provide a pipe skelp having novel welding edges which are adapted to form stronger and smoother welds than those obtainable with the edges heretofore used.

In the drawings:

Figure 1 is an end view of a skelp piece rolled in accordance with this invention.

Figure 2 is an end elevation of a skelp piece shaped prior to its passage through the welding bell.

Figure 3 is a similar view of a welded pipe, the dotted line designating the line of weld.

Referring more particularly to the drawings, the numeral 2 designates the skelp piece as a whole for use in forming true butt-weld pipe, which skelp is formed by reducing a heated billet by any suitable rolling method.

The one longitudinal edge of the skelp piece 2 is transversely dished or hollowed for its entire length to form a truly concave recess 3 extending along the entire longitudinal edge of the piece. The other longitudinal edge of the skelp piece 2 is rounded transversely so as to form a truly convex longitudinal edge 4 extending along the entire longitudinal edge of the piece. The term concave, here and in the appended claims, is intended to describe an edge which is hollow and rounded, as is the interior of a sphere or circle, and is opposed to convex, which term, here and in the appended claims, is intended to describe an edge which is curving like the segment of a globe or of the surface of a circle, so as to form a rounded elevation. Thus it will be seen that the convexed edge is rounded from one side of the skelp piece 2 to the other side thereof, and the concaved edge is hollowed or dished from one side to the other side of said skelp piece.

The convex edge 4 has the same or substantially the same radius as the concave edge 3, and is adapted to snugly fit within the concave recessed edge 3 when the edges of the skelp are brought together in passing through a standard welding bell without an internal support. Thus a butt-welded surface is formed having a materially greater area than the longitudinal cross-sectional area of the skelp, without materially increasing the wall thickness of the pipe formed therefrom.

The finished pipe shown in Figure 3 and designated by the numeral 5, shows by the dotted line 6 the contact or weld line of the edges 3 and 4 when butted and welded.

By forming the skelp as above described, a more uniform edge can be maintained and, therefore, a better weld can be made. Also, due to the novel shape of the edges 3 and 4, the contact or welding area of the edges is increased approximately twenty per cent over the straight edges used prior to this invention.

Due to the uniformity of the edges and the increased contact area of the edges a materially stronger and smoother weld or joint is obtained.

While I have shown and described one specific form of my invention, it will be understood that I do not wish to be limited thereto, since various modifications may be made without departing from the scope of my invention as defined in the appended claims.

I claim:

1. As an article of manufacture a skelp piece for use in forming a true butt-weld pipe by drawing the heated skelp through a forming bell without an internal support, said skelp piece having one of its longitudinal edges formed truly concave from side to side and its other longitudinal edge formed truly convex from side to side so as to snugly abut each other when welded, said edges being adapted to form a butt-welded surface of materially greater area than the longitudinal cross-sectional area of the skelp, without materially increasing the wall thickness of the pipe formed therefrom.

2. As an article of manufacture, a skelp piece for use in forming a true butt-weld pipe, said skelp piece having one of its longitudinal edges formed truly concave from side to side and its other longitudinal edge formed truly convex from side to side so as to snugly abut each other when welded, said edges being adapted to form a butt-welded surface of materially greater area than the longitudinal cross-sectional area of the skelp, without materially increasing the wall thickness of the pipe formed therefrom.

In testimony whereof, I have hereunto signed my name.

CHARLES FELL.